(12) United States Patent
Lee

(10) Patent No.: US 6,354,654 B2
(45) Date of Patent: Mar. 12, 2002

(54) VEHICLE FRAME REINFORCEMENT

(75) Inventor: Seong Hack Lee, Uiwang-shi (KR)

(73) Assignee: Kia Motors Corporation, Seoul (KR)

( * ) Notice: Subject to any disclaimer, the term of this patent is extended or adjusted under 35 U.S.C. 154(b) by 0 days.

(21) Appl. No.: 09/727,797

(22) Filed: Nov. 30, 2000

(30) Foreign Application Priority Data

Dec. 21, 1999 (KR) .................................... 1999-60005

(51) Int. Cl.[7] .............................................. B62D 21/00
(52) U.S. Cl. ..................... 296/188; 296/29; 296/204; 296/205; 280/796; 280/797
(58) Field of Search ................... 296/29, 204, 188, 296/205; 280/796, 797

(56) References Cited

U.S. PATENT DOCUMENTS

| | | | | |
|---|---|---|---|---|
| 2,202,859 A | * | 6/1940 | Ledwinka | .................... 296/204 |
| 5,195,780 A | * | 3/1993 | Inoue et al. | ............ 296/204 X |
| 5,839,776 A | * | 11/1998 | Clausen et al. | ......... 296/204 X |

FOREIGN PATENT DOCUMENTS

| | | | | |
|---|---|---|---|---|
| DE | 976332 | * | 7/1963 | ................. 296/204 |
| JP | 8-58616 | | 3/1996 | |

* cited by examiner

*Primary Examiner*—Joseph D. Pape
(74) *Attorney, Agent, or Firm*—Christie, Parker & Hale, LLP

(57) ABSTRACT

Reinforcement (30) for reinforcing a vehicle frame structure (10), having a triangular shape in cross section, including one section (20) in parallel to a side frame member (11), and the other section (21) being attached to a lower section of the side frame member (11). The present invention prevents interference with pipes passing in a lateral direction of the vehicle frame (10) and the exhaust system components. Further, the reinforcement (30) of the invention has a large section modulus, thereby effectively reinforcing the vehicle frame (10).

5 Claims, 4 Drawing Sheets

VEHICLE FRAME REINFORCEMENT

CROSS-REFERENCE TO RELATED APPLICATION

This application claims priority of Korea patent Application No. 1999-60005, filed on Dec. 21, 1999.

FIELD OF THE INVENTION

The present invention relates to a reinforcement of a vehicle frame structure, more particularly to a reinforcement for minimizing interference with other components to be installed around the frames and for reinforcing the weakened portions on a side frame member in a motor vehicle frame structure.

BACKGROUND OF THE INVENTION

Generally, motor vehicles are provided with a pair of lateral side frame members which extend in a lateral direction of the vehicle. Each of the two side frame members is connected by at least one cross frame member. A reinforcement and bumper or the like is engaged by securing elements such as rivets, bolts or welding to the side frame member. The frame structure is referred to H-shaped frame because of the outline of the frame members.

The side frame member functions to support load, and absorb, deliver rearward and disperse impact load when a sudden impact force is imposed on the vehicle from a collision.

The cross section of side frame member is in a rectangular shape. A kick-up frame is bent so as to lower the underside panel of the vehicle, i.e., passenger cars and buses.

FIG. 1 is a side view of the general frame structure of the vehicle. A typical frame structure 10 for the vehicle is provided with a pair of side frame members 11 in a lateral direction and at least one cross frame member 12 for connecting the side frame member 11 at a predetermined position thereof At one end of the side frame member 11, a kick-up frame 13 which is bent to lower the underside panel of the vehicle is connected in itself.

In this frame structure, when a collision of the vehicle occurs, an abrupt impact load is delivered on the side frame member 11 from a bumper (not shown) and absorbed by deformation of the side frame member 11. However, at the time of collision, the impact load is concentrated on the kick-up frame 13 and serious deformation of the kick-up frame 13 results in a severe injury of a driver and/or passengers by the impact.

Japanese Patent Laid-open Publication No. (Pyung) 8-58616 discloses a bumper stay for reinforcing the side frame member, as shown in FIG. 4.

In FIG. 4, the bumper stay C in a stair-shape in cross section, is formed as a reinforcing means for reinforcing an interconnection of the side frame member A with the cross frame member B which is transversely disposed on the side frame member A. The bumper stay C is secured to the side frame member A and the cross member B via bolts, respectively.

Although the conventional side frame member A of the vehicle includes the reinforcement installed to the side frame member A for reinforcing the side frame member A itself or the bumper stay C secured at the interconnection of the side frame member A with the cross frame member B, section modulus or reinforcing effect is not improved.

As a result, the conventional frame members have a disadvantage that the impact is concentrated on the kick-up frame 13, thereby causing a driver and/or passengers to be exposed to a severe injury by the impact.

OBJECT OF THE INVENTION

It is therefore an object of the present invention to provide a reinforcement disposed on the kick-up frame of the side frame member, which prevents a passenger compartment of the vehicle from deforming or buckling, so that a driver and/or passengers may secure a security space despite collision.

It is the other object of the present invention to provide a reinforcement for absorbing impact applied thereto, which increases section modulus thereof to effectively reinforce the side frame member and eliminates interference in the assembly process of a fuel pipe and an exhaust pipe or the like.

In order to accomplish the above objects, there are provided a pair of laterally extending side frame members 11 disposed on each side of a vehicle body and at least one cross frame member 12 disposed between the side frame members 11. The side frame members 11 are provided with the kick-up frames 13, each integrally and inwardly bent formed at one end of the side frame member 11. The present invention further comprises a reinforcement 30 installed at the interconnection of the side frame member 11 with the kick-up frame 13.

The reinforcement 30 does not interfere with any pipes or components in the exhaust system.

Additionally, the reinforcement 30 prevents the passenger compartment of the vehicle from deforming or buckling, so that a driver and/or passengers may secure a security space despite collision, thereby improving security and reliability of the vehicle.

BRIEF DESCRIPTION OF THE DRAWINGS

The above and other objects and features of the present invention may be understood with reference to the following detailed description of an illustrative embodiment of the invention, taken together with the accompanying drawings in which.

DETAILED DESCRIPTION OF THE PREFERRED EMBODIMENT

Figure 1:
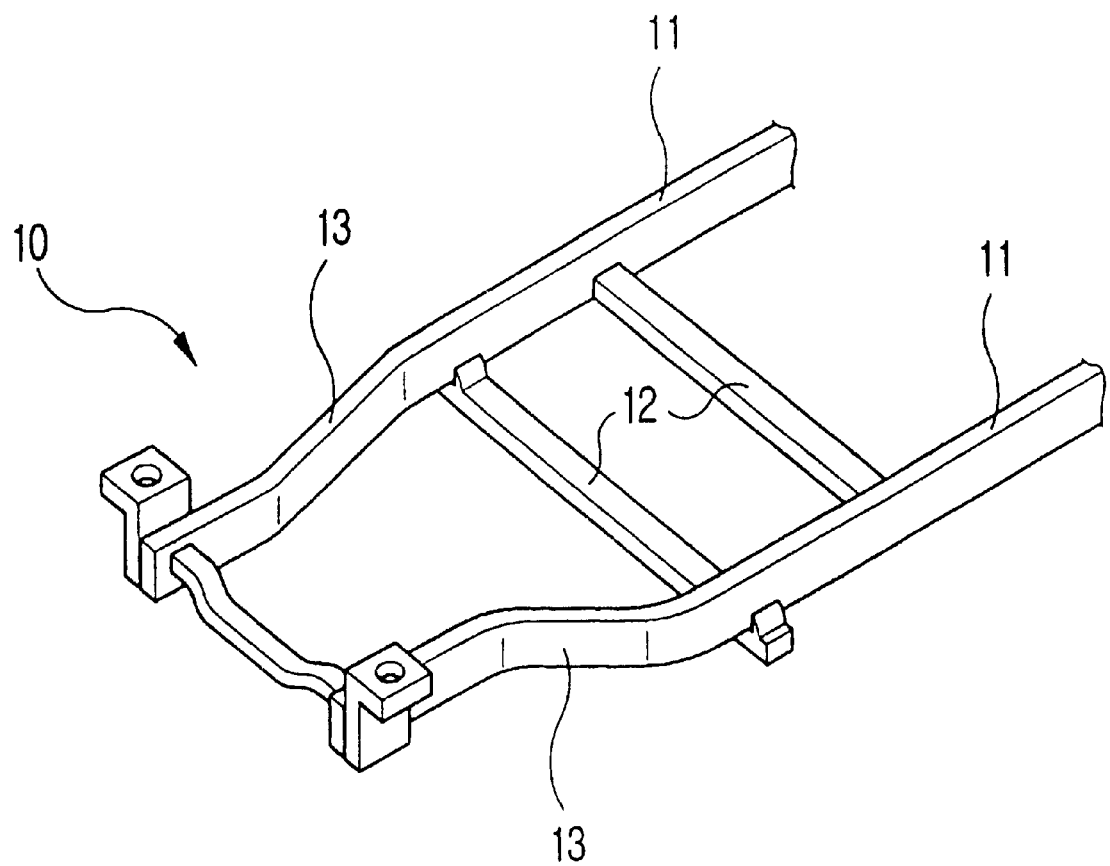
FIG. 1 is a side view of a general frame structure of the vehicle.

FIG. 1 shows a general frame structure. The frame structure comprises a pair of side frame members 11 extending in the lateral direction of the vehicle, each of which is connected by at least one cross member 12 at a predetermined position thereof, a kick-up frame 13 having a bent portion and; integrally formed with the side frame member 11, and a reinforcement 30 installed at the interconnection of the side frame member 11 with the kick-up frame 13.

Figure 2:
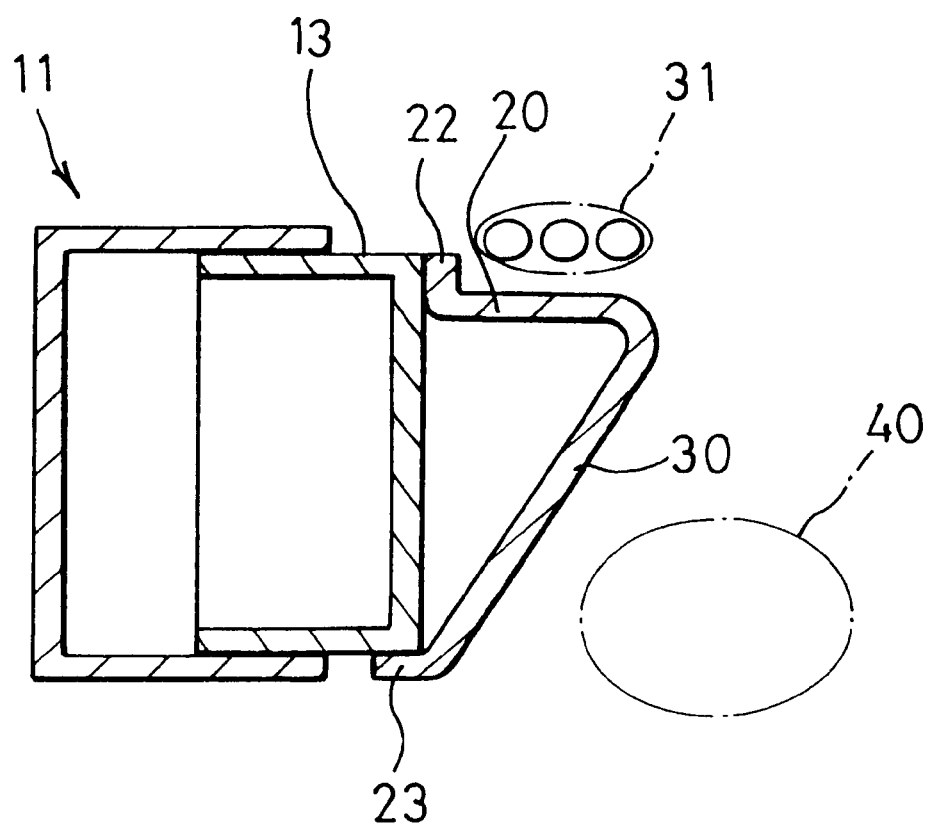
FIG. 2 is a sectional view of a preferred embodiment of the frame structure to which reinforcements are installed according to the present invention.

Referring to FIG. 2, a reinforcement 30, defining a hollow and triangular cross section, includes a flat top section 20 in parallel to a top section of the side frame member 11 and a slope section 21 which is inclined downwardly and formed integrally therewith.

The end of the flat top section 20 and the end of the slope section 21 have flanges 22, 23 thereof, respectively, so that the top section 20 and the slope section 21 may be fixed and welded to be in contact with upper and lower portions of the side frame member 11.

Accordingly, the reinforcement 30 is installed in the kick-up frame 13 of the side frame member 11, as shown in FIG. 2.

For the side frame member 11, an unimpaired square pipe may be utilized or two channel members in the shape of a bracket extending both ends, i.e., "[" in opposite for engagement in the lateral direction are utilized as in FIG. 2.

When the reinforcement 30 is installed at the interconnection of the side frame member 11 with the kick-up frame 13, the pipes 31 e.g., a fuel pipe and a brake pipe are preferably positioned above the reinforcement 30.

Then, the exhaust system components 40 are positioned at a predetermined distance from the outer surface of the slope section 21 of the reinforcement 30, since the exhaust system components 40 are maintained at a high temperature by heat from the exhaust gas of the engine.

Figure 3:
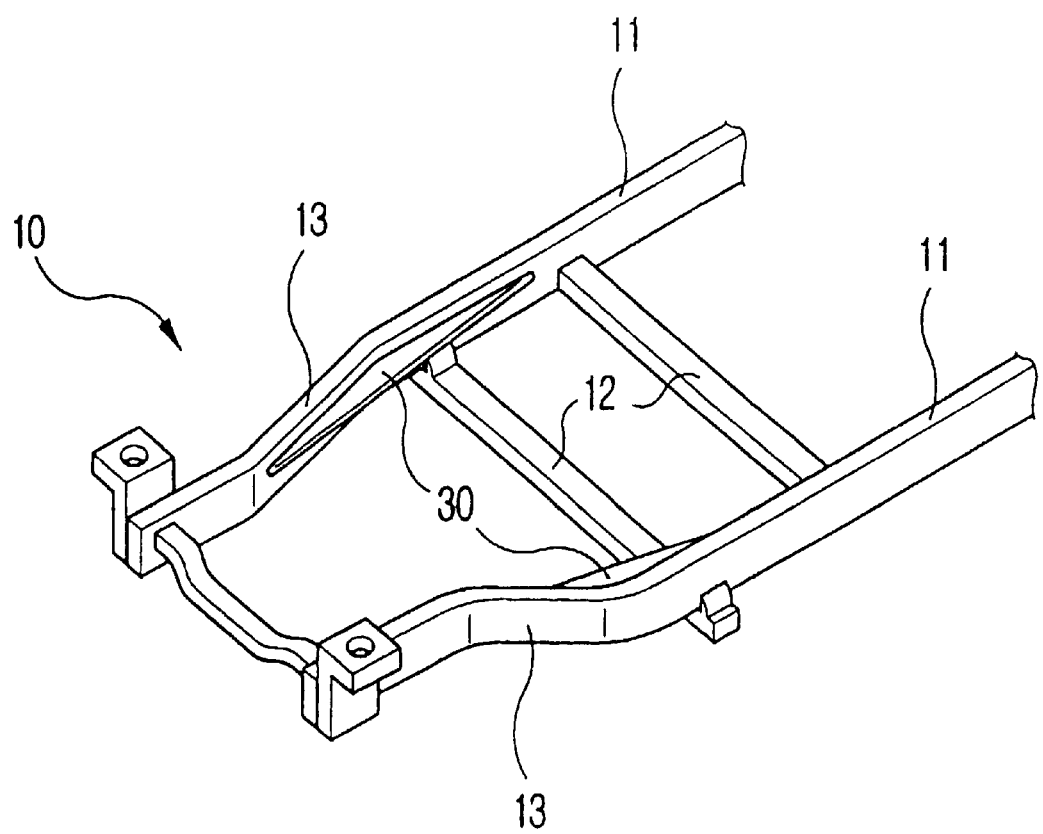
FIG. 3 is a perspective view of a preferred embodiment of the frame structure to which reinforcements are installed according to the present invention.
Figure 4:
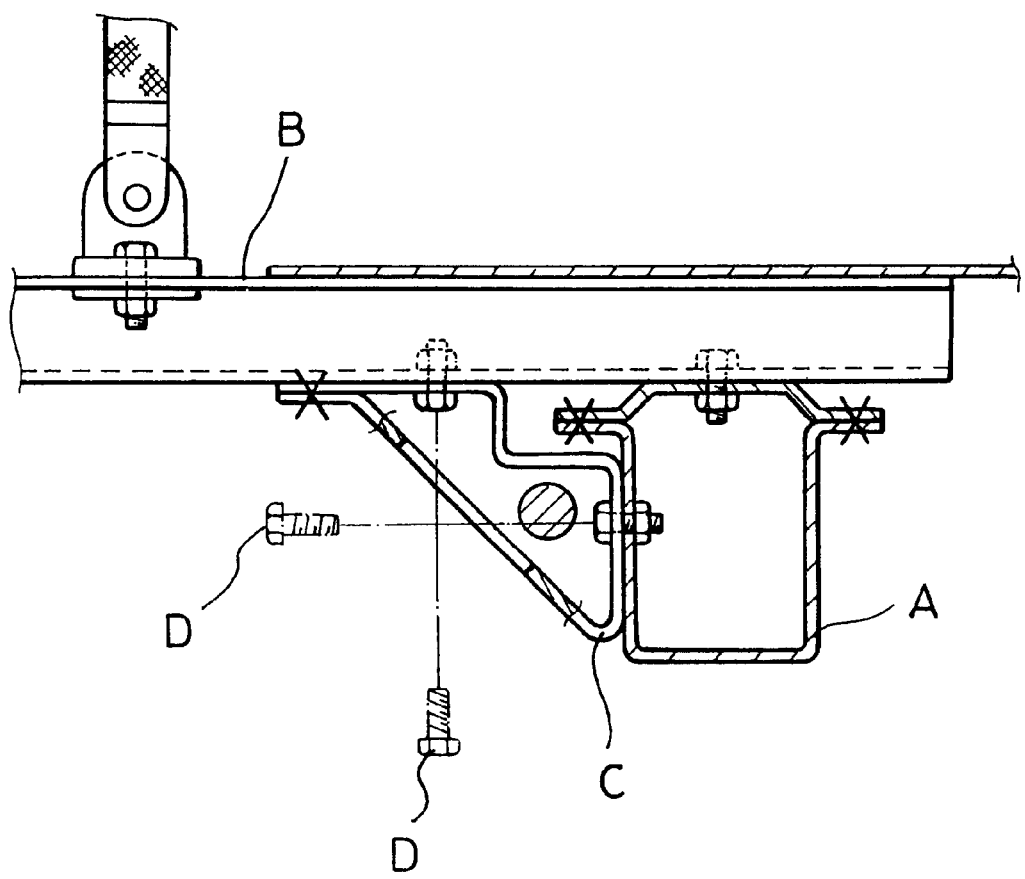
FIG. 4 is a sectional view of the bumper stay according to the conventional frame structure.

FIG. 3 is a perspective view of a preferred embodiment of the frame structure to which reinforcements are installed according to the present invention.

As shown in FIG. 3, the vehicle frame structure 10 comprises a pair of lateral side frame members 11 which extend in the lateral direction of the vehicle. Each of the two side frame members 11 is connected by at least one cross member 12 at a predetermined position. The kick-up frame 13 is bent to lower the underside panel of the vehicle, and is integral with the side frame member 11.

According to the present invention, the reinforcement 30 is installed along the kick-up frame 13 and the interconnection of the side frame member 11 therewith for reinforcing the weakened portion of the side frame member 11 in the event of a collision.

Accordingly, the reinforcement 30 having a large section modulus thereof effectively reinforces the vehicle frame 10, thereby preventing the deformation of the passenger compartment of the vehicle despite collision and accommodating a driver and/or passengers to secure a security space.

Additionally, the present invention avoids interference with the exhaust system components and the pipes passing in the lateral direction of the vehicle, so that the vehicle pipes such as a fuel pipe or a brake pipe block the heat emitted from the exhaust system components, to guarantee piping security. The present invention improves security and reliability of the vehicle.

The present invention is not limited to these embodiments, and it should be clear to those skilled in the art that other embodiments are possible within the spirit and scope of the invention claimed.

What is claimed is:

1. A reinforced vehicle frame structure (10) comprising a pair of lateral side frame members extending in a lateral direction of the vehicle, and at least one cross frame member connecting the side frame members at a predetermined position of the side frame members, each of the side frame members having a kick-up frame inwardly bent at the end thereof, and a reinforcement installed at the interconnection of the side frame member with a kick-up frame of the side frame member, wherein said reinforcement has a flat top section in parallel to a top section of the side frame member and a slope section which is inclined downwardly having a hollow, triangular shape.

2. A reinforced vehicle frame according to claim 1, wherein said top section and said slope section include flanges integrally curved at an end thereof so that the top section and the slope section may be fixed with upper and lower portions of the side frame member.

3. A reinforced vehicle frame comprising:

a pair of side members, each of said side members comprising a first portion and a second bent portion;

a cross frame member interconnecting said side members; and a reinforcing member for each side member, each reinforcing member coupled to its corresponding side member at the first and second portions, each reinforcing member comprising,
a lateral section extending away from its corresponding side member, and
a sloped section extending to its corresponding side member.

4. A reinforced vehicle frame according to claim 3 wherein each side member comprises an upper surface and wherein the lateral section of each reinforcing member is generally parallel to the upper surface of its corresponding side member.

5. A reinforced vehicle frame according to claim 3 wherein each reinforcing structure further comprises:

a first flange extending from the lateral section and welded to its corresponding side member; and a second flange extending from the slope section and welded to its corresponding side member.

* * * * *